Dec. 31, 1963   E. BRODTMANN   3,115,743
SUPPORTING MEANS FOR A THREAD TURNING TUBE
Filed March 13, 1961
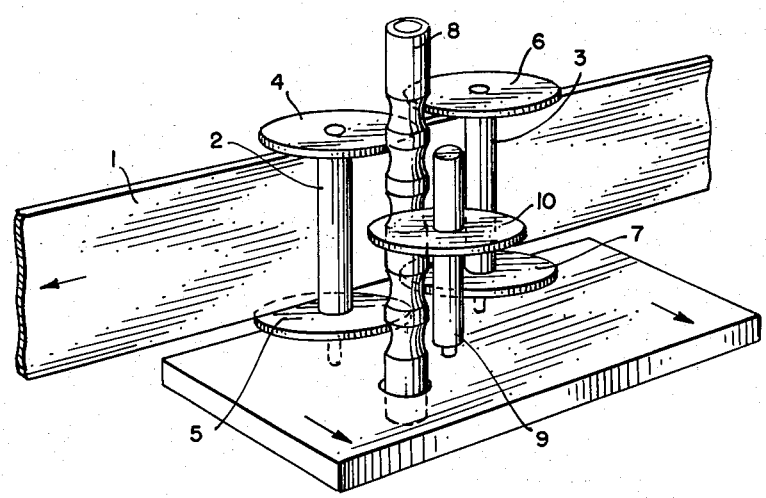
*INVENTOR:*
EDGAR BRODTMANN
BY *Margall, Johnston,
Cook & Root*
ATT'YS

United States Patent Office 3,115,743
Patented Dec. 31, 1963

3,115,743
SUPPORTING MEANS FOR A THREAD TURNING TUBE
Edgar Brodtmann, Wuppertal-Barmen, Germany, assignor to Vereinigte Glanzstoff-Fabriken Aktiengesellschaft, Wuppertal-Elberfeld, Germany
Filed Mar. 13, 1961, Ser. No. 95,226
Claims priority, application Germany Mar. 25, 1960
5 Claims. (Cl. 57—77.45)

The present invention relates to a device for producing a false-twist in textile yarns. More particularly, the subject invention is directed to a turning tube for twisting threads and to means for supporting said turning tube.

Synthetic threads are often upgraded by passing them through so-called false-twist devices. Such devices twist a thread a given number of turns in one direction and then unwind the thread the same number of turns in the other direction. If the thread is placed in contact with a heating means between the winding and unwinding steps, the thread will acquire a permanent rotation around its axis after it has been unwound. Materials of this type are widely used in producing stretch stockings and the like.

One of the elements of a false-twist device is a hollow tube through which the threads are run. The tube is driven by an endless belt. In the past, such turning tubes were journaled in support bearings. Due to the high turning speeds at which such tubes are usually rotated, the maintenance of the bearings became a major problem.

In order to eliminate the need to replace bearings periodically, a false-twist device was developed in which the turning tube, without bearings, was driven by a belt. The tube was provided with grooves in which supporting discs of tube supporting rollers were run. The supporting discs fixed the tube in place and also prevented a displacement of the tube in an axial direction. The use of supporting rollers and discs proved to be highly successful and made it possible to employ spindle rates of revolution up to as much as 250,000 revolutions per minute (r.p.m.).

Although the use of supporting rollers and discs provide substantial advantages over the use of bearings, such arrangements present significant problems. One such problem occurs whenever the turning tube with its support rollers is pressed against the drive belt. The turning tube, because of its lightweight and low moment of inertia, very quickly reaches a turning speed corresponding to the belt speed. This is particularly true because the contact area between the belt and the tube generally is rather large. The tube, in turn, drives the supporting rollers by means of the supporting discs of the rollers. Because the discs have only single point contact with the tube and because of the greater mass of the supporting rollers, the rollers have a much greater moment of inertia than the turning tubes. Little change can be made in this unfavorable relationship because the supporting disc edges have to taper sharply in order to avoid the formation of excessive heat during the operation.

At a turning rate of about 250,000 r.p.m. the twist tube reaches a circumferential velocity of about 50 meters per second. This high speed makes it impossible to avoid damage to the contact edges of the supporting rollers, especially at the beginning of the process. Each time the turning tube is placed in contact with the drive belt the tube burns a small notch in the discs of the supporting roller. Because it is necessary to disengage the tube from the belt periodically in order to place a thread in the tube, the circumference of the supporting discs becomes damaged rapidly to such an extent that a smooth running of the turning tube is difficult to obtain or after a considerable period it cannot be obtained at all. The supporting rollers must then be changed which involves a considerable expense.

The present invention has as its principal objective the formation of a twist device and a supporting means which avoids the difficulties set forth above.

Another object of the invention is to provide a turning device which can be run at high speeds without excessive wear.

Other objects will become apparent to those skilled in the art from the following detailed description of the invention.

In general, the device of the present invention includes three or more supporting rollers and supporting discs at least one of which is in contact with the drive belt and which in turn drives the turning tube. In a preferred embodiment of the invention two of the supporting rollers are in contact with the drive belt and with the turning tube while a third supporting roller is rotated by the turning tube.

The invention will become more apparent to those skilled in the art by reference to the attached drawing. The figure is a perspective view of one embodiment of the subject device.

In the drawing, belt 1 drives support rollers 2 and 3. Discs 4, 5, 6, and 7 of support rollers 2 and 3 lie in their respective grooves of turning tube 8. A third support roller 9 is arranged in such a manner that, during the operating state, the connecting lines between the three axes of the rollers, in a plane perpendicular to the three axes, form an isosceles triangle or, if all of the supporting discs are of equal diameter, an equilateral triangle. Support roller 9 includes supporting disc 10 which engages a groove in the turning tube which groove is approximately at the center of gravity of the turning tube. The device is mounted in such a manner that the supporting rollers and the turning tube can either be swung out from the belt or the belt can be swung out from the supporting rollers and the turning tube. It is also within the scope of the invention to have the device arranged so that two or even one of the supporting rollers are mounted so as to swing out. In the first case, it is possible for one of the rollers to be moved far enough away from the turning tube to enable the tube to be removed. The turning tube is secured during the swinging out stage in a known manner.

As was indicated above, the number of supporting rollers in the present device is increased to three. By this means it is possible to place the turning tube among the 3 supporting rollers in such a way that it no longer comes in contact with the drive belt. The belt instead drives one or two of the supporting rollers, which roller or rollers then drives the turning tube. Those supporting rollers not in contact with the belt are driven by the turning tube.

In the subject arrangement the belt no longer engages the turning tube over its entire width and, therefore, the acceleration of the turning tube is considerably reduced. The driven support roller has only a slightly area of contact with the tube through its supporting discs. For this reason differences between the circumferential velocities of the turning tube and the supporting rollers are no longer so great that damage occurs to the disc edges everytime the operation begins. Correspondingly, even with very high differential velocities between the supporting disc edges of the support roller and the turning tube, the formation of burned spots in the turning tube is no longer a factor inasmuch as with excessive heat development the edges of the supporting discs are uniformly worn away and the turning tube is not damaged. The magnitude of the torque which is transmitted from the belt to the supporting roller, of course, can be greatly influenced by the design of the surface coming in contact with the belts.

In a preferred embodiment of the present device, two of the support rollers bear against the belt so that they both drive the turning tube. The turning tube then acts only on a third support roller.

The arrangement of the three support rollers with respect to the turning tube can be varied. The three support rollers, for example, may be of exactly the same form in which case they have to be shifted with respect to the turning tube axis to such an extent that the supporting discs have room above and beneath each other. Another possibility is to have the support discs emboxed or telescoped within each other in such a way that one support roller carries the two outer support discs. The next carries two discs within these discs, and the third carries only a support disc engaging at the level of the center of gravity of the turning tube.

Still another possibility would be to provide on the turning tube notches for only one support roller carrying, for example, only one disc. In this modification it would no longer be necessary to have the other supporting discs taper sharply whereby they are less subject to wear.

Obviously many modifications and variations of the invention as hereinbefore set forth may be made without departing from the spirit and scope thereof, and therefore only such limitations should be imposed as are indicated in the appended claims.

I claim:
1. A false-twist device which comprises an elongated turning tube through which threads are passed, three support rollers arranged around said turning tube, said support rollers including discs in contact with said turning tube, said discs having tapered edges and said turning tube being notched to provide a seat for said tapered discs, at least two of said support rollers each having paired discs at a spaced interval along and in contact with said elongated turning tube and said support rollers each having a higher moment of inertia than said turning tube, two of said support rollers being in contact with an endless drive belt, thereby transferring torque from said driven rollers having a higher moment of inertia to said turning tube having a lower moment of inertia.

2. A false-twist device as claimed in claim 1 wherein said support rollers and said turning tube are pivotally mounted for movement away from and toward said belt.

3. A false-twist device as claimed in claim 1 wherein connecting lines between the three axes of the rollers, in a plane perpendicular to the three axes, form an isosceles triangle.

4. A false-twist device as claimed in claim 1 wherein connecting lines between the three axes of the rollers, in a plane perpendicular to the three axes, form an equilateral triangle.

5. A false-twist device as claimed in claim 1 wherein one of said support rollers has a single supporting disc which disc engages the turning tube substantially at the center of gravity of said tube.

References Cited in the file of this patent
UNITED STATES PATENTS 2,855,750     Schrenk et al. _____ Oct. 14, 1958

FOREIGN PATENTS 552,212     Belgium _____ Nov. 14, 1956
261,326     Switzerland _____ Aug. 16, 1949